United States Patent [19]  
Eddy et al.

[11] 4,130,956  
[45] Dec. 26, 1978

[54] BUTTON AND APPARATUS FOR FABRICATION THEREOF

[75] Inventors: Albert W. Eddy; Roger W. Lyngklip, both of Winona, Minn.

[73] Assignee: Technigraph Corporation, Winona, Minn. ; by said Roger W. Lyngklip

[21] Appl. No.: 698,749

[22] Filed: Jun. 22, 1976

Related U.S. Application Data

[62] Division of Ser. No. 528,787, Dec. 2, 1974, Pat. No. 3,997,052.

[51] Int. Cl.² .............................................. A44C 3/00
[52] U.S. Cl. .................................................... 40/1.5
[58] Field of Search ...................... 40/1.5, 160, 1.6, 20, 40/25

[56] References Cited

U.S. PATENT DOCUMENTS

| 1,418,222 | 5/1922 | Zeller | 40/1.5 |
| 2,178,024 | 10/1939 | Popilio | 40/1.5 X |
| 2,762,146 | 9/1956 | Milazzo | 40/1.5 |
| 2,797,508 | 7/1957 | Rosen | 40/1.5 |
| 3,212,204 | 10/1965 | Smith | 40/1.5 |
| 3,822,494 | 7/1974 | Zivica | 40/160 |
| 3,949,506 | 4/1976 | Benkowski | 40/160 |

Primary Examiner—Russell R. Kinsey  
Assistant Examiner—Wenceslao J. Contreras  
Attorney, Agent, or Firm—Merchant, Gould, Smith, Edell, Welter & Schmidt

[57] ABSTRACT

A method and means for fabrication of a relatively low cost display or communicative novelty button in which a consumable restrictor sheet is placed over a vacuum draw type female mold cavity. The restrictor sheet may be of cardboard and be apertured with a diameter smaller than the mold cavity diameter. A thermoplastic sheet material is then placed over the restrictor sheet, heated to reach a formable state and vacuum drawn through the restricted aperture and down so that the sheet comes into contact with and generally conforms to the desired shape defined by the mold cavity. The plastic sheet material may then be trimmed near the edge of the restrictor sheet to leave a button shell mounted on a restrictor sheet which may then be used for purposes of display. The restrictor sheet also enables fabrication with an inwardly facing peripheral groove that may be used to secure a pin fastener. An alternate form of fastener in which a portion of the remaining plastic sheet is used is also disclosed.

4 Claims, 13 Drawing Figures

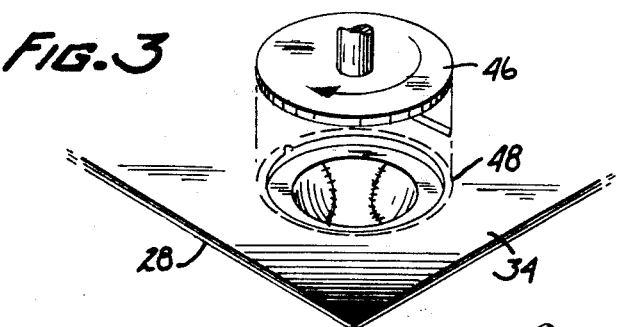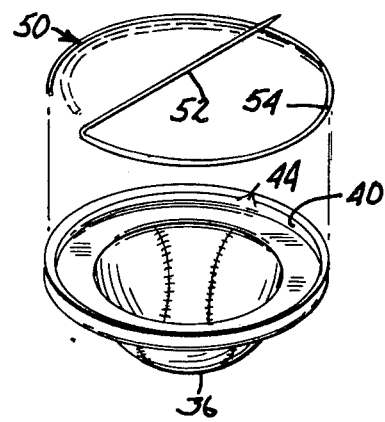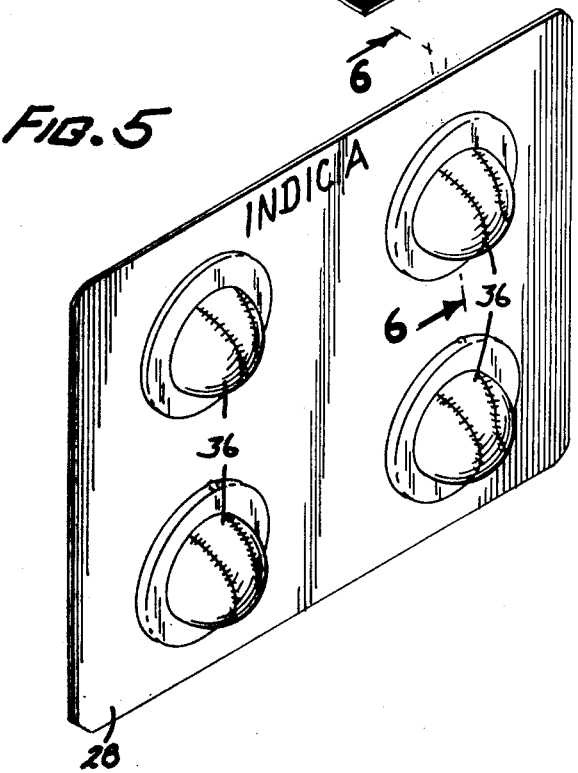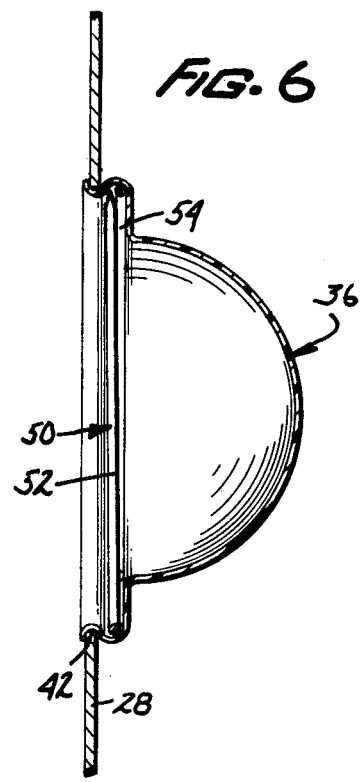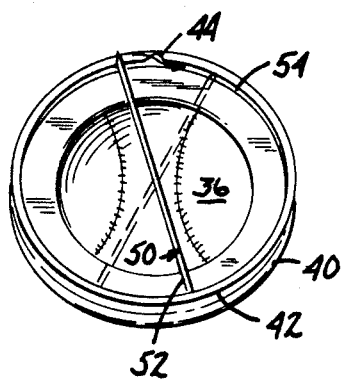

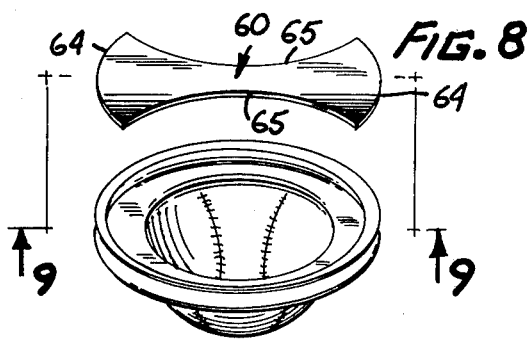
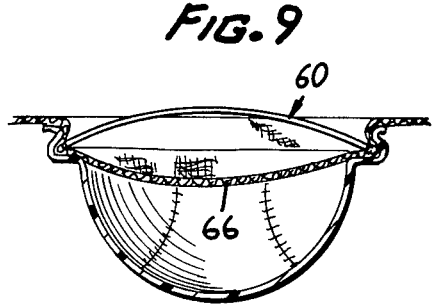
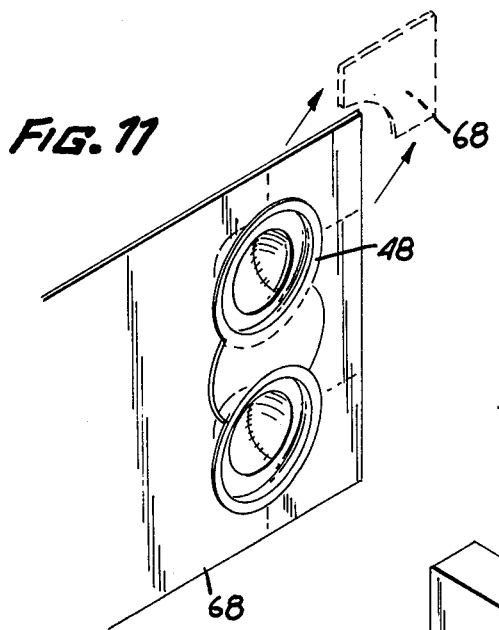
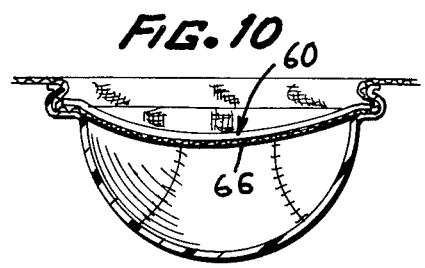
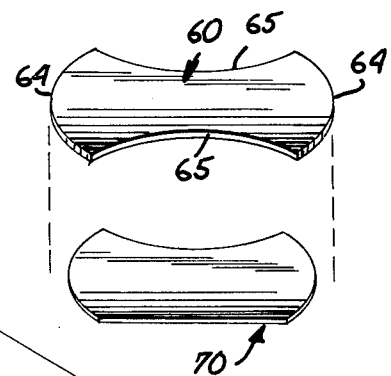
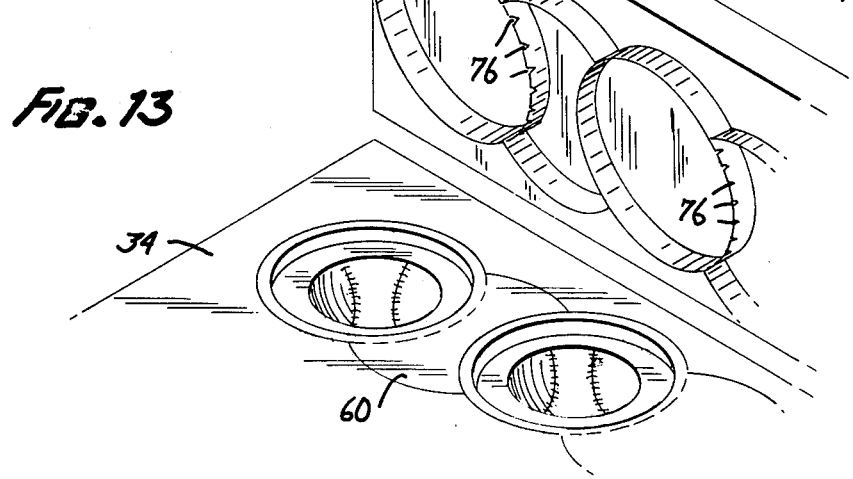

BUTTON AND APPARATUS FOR FABRICATION THEREOF

This is a division of application Ser. No. 528,787, filed Dec. 2, 1974 now U.S. Pat. No. 3,997,052.

BACKGROUND OF THE INVENTION

This invention relates generally to fabrication of novelty or communicative display buttons and more particularly concerns an improved method for fabricating such buttons and improved buttons fabricated in accordance with the new method.

The art of button fabrication is a relatively mature art. Buttons used for campaign purposes, communicative purposes and novelty purposes are traditionally fabricated by the use of a multiple part button in which a plasticized display sheet is stretched or otherwise fastened across the front of a substantially planar circular button and fastened at the reverse side thereof by a second plate which mates with the backing plate for the button. A pin is then sometimes placed with a portion thereof in a peripheral annular groove in the button and a substantially diametrical shank pin portion extending beyond the button for the purpose of fastening to a garment. The shortcomings of such a method of manufacture and buttons resulting from such a fabrication method are many.

Among these shortcomings are the necessity for a large number of parts, and difficulties in assembly. Further, the buttons produced by this method are difficult to display. If they are to be arranged for sale, they must often be individually pinned to a display sheet or other suitable point of sale display material. In addition in the past it has been difficult to readily fabricate a communicative button in which the image forming surface was three dimensional with some features in relief.

The present invention overcomes these disadvantages and shortcomings of the prior art by providing a button and a method of fabrication thereof in which the button has only two individual pieces. In addition the button is fabricated from a one piece outer shell which defines a peripheral groove for insertion of a button pin and in certain preferred embodiments provides an escapement notch for safe and easy fastening and unfastening of the button from a garment. Futhermore, the method of fabrication of the button naturally results in a readily available display material and button combination.

SUMMARY OF THE INVENTION

In accordance with the invention, outer shells for the button are fabricated by the use of a female cavity vacuum type mold which may have a plurality of mold cavities therein. A consumable restrictor sheet is placed over the mold cavities with a plurality of apertures therein which register with the mold cavities. Each of the apertures in the restrictor sheet has at least a portion thereof cut to a size which overhangs the mold cavity to present a restriction to thermoplastic sheet material placed over the restrictor sheet. The thermoplastic sheet material is placed over the sheet and heated to reach a formable state. The material is then vacuum drawn or otherwise forced through the restrictive apertures into the mold cavity to generally conform to the cavity defined by the combination of the restrictive aperture and the female mold cavity.

The excess plastic sheet material may then be trimmed from around the edge of the apertures leaving one or more plastic button shells fastened to the consumable restrictor sheet and having an inwardly facing peripheral groove suitable for mounting a fastening pin thereto.

In certain embodiments of the invention the restrictor sheet may have a notch therein. The drawing process in such embodiments will create an escapement notch for the fastening and unfastening of a pin for the purpose of fastening the button shell to a garment.

Furthermore, in certain embodiments it may be desirable to use an inner cross member of resilient plastic material as the fastening element. In those instances, it is possible to fabricate the fastener from a portion of sheet material contiguous to the button shell and to destructively remove the restrictor sheet to leave a button-fastener combination. Such a combination is then readily saleable and usable for novelty and promotion purposes.

BRIEF DESCRIPTION OF THE DRAWINGS

The advantages of the invention and objects attained by it will become more apparent upon the reading of the following detailed description and upon reference to the drawings, wherein the use of like reference numerals throughout the several views indicates like elements:

FIG. 3 is a perspective view of a vacuum drawn button shell showing the step of removing scrap material to complete the shell;

FIG. 4 is a perspective view illustrating insertion of a pin into a finished button shell;

FIG. 5 is a perspective view showing a plurality of button shells mounted to a consumable restrictor sheet usable for the purpose of point of sale display;

FIG. 6 is a cross-sectional view of one button in assembled relation with the restrictor display sheet with a pin fastener inserted therein;

FIG. 7 illustrates the use of a particular pin fastener in certain preferred embodiments of the present invention in which the restrictor sheet is provided with a notch for the purpose of creating an escapement notch in the button shell;

FIG. 8 is a perspective view showing a finished button shell and an alternate fastener element;

FIGS. 9 and 10 are cross-sectional views of the fastener and shell of FIG. 8 in assembled relation showing a method of fastening the button shell to a garment;

FIG. 11 is a perspective view with portions shown in dotted line form to illustrate removal of a consumable restrictor sheet from a button and fastener element of the type shown in FIGS. 8 through 10;

FIG. 12 illustrates an alternate embodiment of the fastener element shown in FIGS. 8 through 10; and FIG. 13 is a perspective view illustrating one step in the fabrication of button shell and fastener element assemblies of the type shown in FIGS. 8 through 12.

While the invention will now be described in connection with preferred embodiments and procedures, it will be understood that the invention is not limited in scope to those embodiments or procedures. On the contrary, all alternatives, modifications and equivalents included within the spirit and scope of the invention as defined by the appended claims are covered.

DETAILED DESCRIPTION OF THE INVENTION

Figure 1:
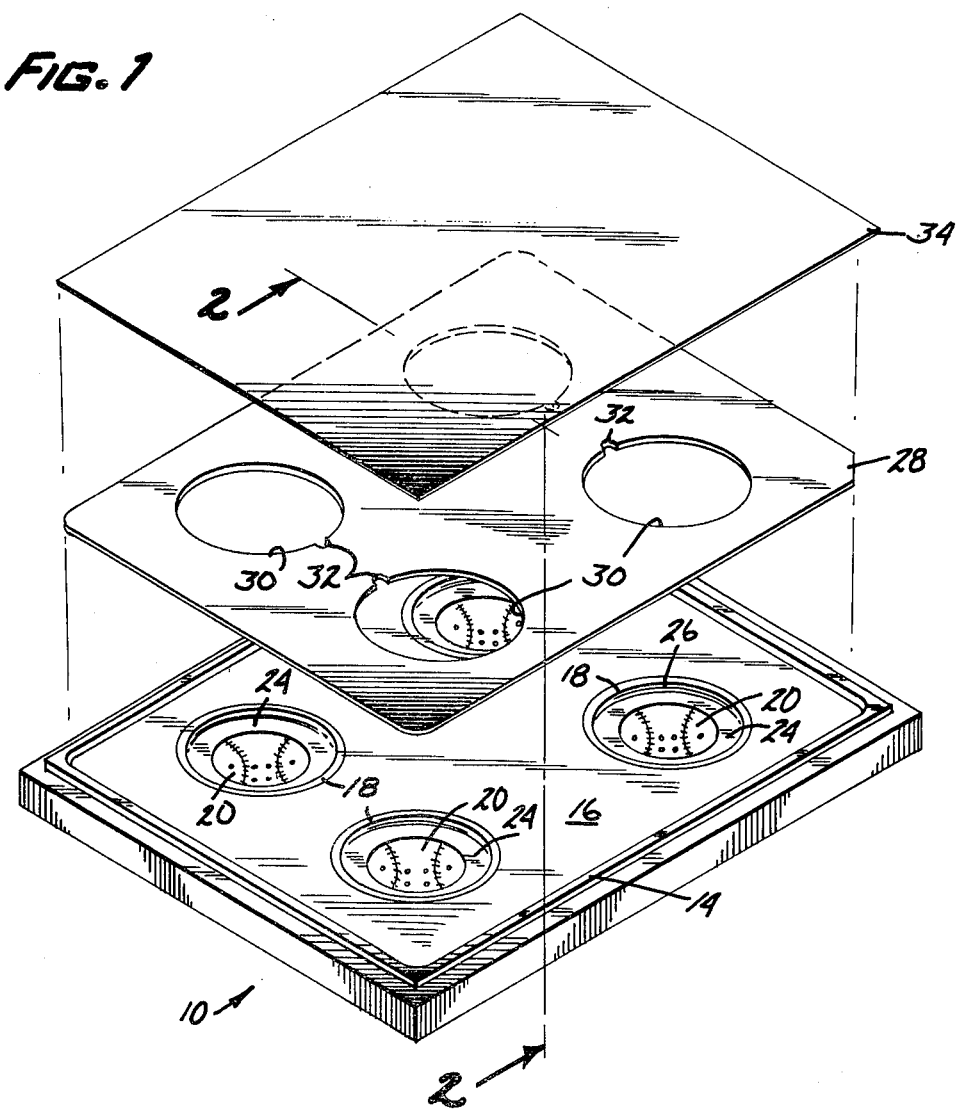
FIG. 1 is a simplified exploded perspective view showing basic elements used in practice of the inventive method of button fabrication according to a preferred procedure of the present invention.

Turning first to FIG. 1, there is shown an exploded perspective view which illustrates key elements used in practice of the method of the present invention according to one preferred procedure thereof. Appearing in FIG. 1 is a female vacuum type mold generally designated 10 for the purpose of molding thermoplastic material. Mold 10 has a mold base 12 having a raised continuous ridge 14 thereon. A mold plate 16 fits onto a shoulder on mold base 12 and has a plurality of apertures therein in which individual mold cavity inserts 18 are placed.

The mold plate may be fabricated of aluminum or any other suitable material. The mold cavity inserts 18 have a mold cavity surface 20 therein which defines the mold cavity and is shaped to receive into contact and mold a thermoplastic material into a desired configuration. Although the mold plate and mold cavities have a generally circular periphery in the button fabrication method shown, the present inventive method and buttons fabricated thereby are not limited to such a configuration. The mold cavity inserts 18 each have a plurality of passages 22 for connectin to a source of vacuum such as a vacuum pump. The openings of passages 22 are arranged strategically on mold cavity surface 20 to avoid areas where drawn moldable material may seal against cavity surface 20 to encapsulate air.

Figure 2:
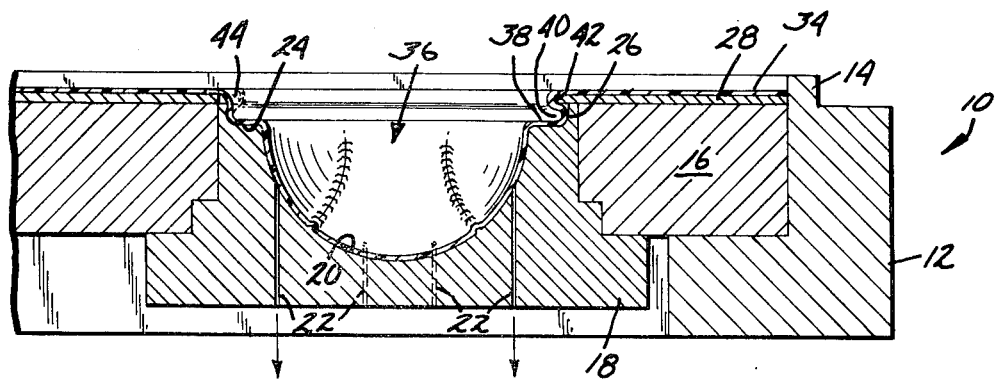
FIG. 2 is a cross-sectional view of the elements of FIG. 1 in assembled relation after the process step of vacuum draw has taken place, particularly illustrating the button shell structure fabricated by the drawing step.

As shown more particularly in a cross-sectional view of FIG. 2, mold cavity surface 20 may include a peripheral flat shoulder 24 near the upper edge of the cavity surface which in the present embodiment is annular in shape. This shoulder may serve the dual purpose of creating a strengthening button flange and defining one side of a fastener groove. Immediately adjacent shoulder 24 is a vertical rim wall 26 which is substantially cylindrical in shape and extends upward to define the top edge of the mold cavity surface.

In the fabrication procedure a consumable restrictor sheet 28 which may be fabricated of light carboard, relatively heat resistant sheet plastic, sheet metal, plywood, hardboard or the like is placed over the top surface of mold plate 16 and the individual mold cavities as shown in FIGS. 1 and 2. Depending on the intended final use of the restrictor sheet and button shell combination, any of a variety of consumable materials of varying thicknesses may be used. For example, while it may be preferred to use 0.018 inch cardboard for the purpose of fabrication of novelty button shells, the same technique could be effectively used for thicker thermoplastic plaques, in which case it might be desirable to use a restrictor sheet of 0.25 inch hardboard. In any event, consumable restrictor sheet 28 has therein a plurality of apertures arranged in spaced relation so that the restrictor sheet 28 may be placed with the apertures in alignment with individual mold cavities. In fact, mold plate 16 may have register pins which mate with holes in the restrictor sheet for the purpose of creating such alignment. However in the embodiment shown, the register is maintained by the ridge 14 and contact between the periphery of restrictor sheet 28 and ridge 14.

It is important to the present inventive procedure that the apertures be sized to overhang the mold cavity with a diameter somewhat smaller so that the restrictor sheet presents a restricted aperture as shown in the cross-sectional view of FIG. 2. The amount of restriction or overhang of the restrictor sheet beyond the aperture defined by vertical rim wall 26 is selected to be compatible with the plastic material to be molded. In one instance of practice of the invention where 0.020 inch thick polystyrene was used as molded material, the amount of overhang selected was approximately 3/32 inch or a total diametrical restriction of 3/16 inch.

In the procedure illustrated by the apparatus of FIGS. 1 and 2, each of apertures 30 is provided with a small rounded notch 32 therein. The purpose of notch 32 is to create an escapement notch in the final molded plastic shell as will become more apparent below.

In practice of the inventive button fabrication procedure, a plastic sheet 34, shown in FIG. 1 having a generally rectangular shape, is placed over the assembled restrictor sheet and vacuum mold arrangement. This plastic sheet may be any suitable thermoplastic material which may be heated to become moldable at a temperature substantially below that at which the consumable restrictor sheet 28 may be damaged. In one practice of the present invention, the plastic sheet 34 used was a 0.020 inch thick polystyrene material which reached a formable state at temperatures in the range of 320° F. The restrictor sheet used with this sheet material was 0.018 inch thick cardboard restrictor sheet not damaged at such temperatures.

In practice of the invention, once the plastic sheet 34 is placed over the restrictor sheet 28 and effectively sealed thereto by gravity or other suitable sealing means providing face-to-face contact between the bottom surface of sheet 34 and restrictor sheet 28, plastic sheet 34 is heated to its moldable state. A partial vacuum is then applied to the plurality of passages 22. This causes the plastic sheet 34 to deform and generally to be drawn down into the mold cavity through the restrictor sheet apertures 30. This vacuum drawing process continues with atmospheric pressure above the sheet forcing it downward and into contact with the edge and surface of the restrictor sheet, rim wall 26 and the remainder of mold cavity surface 20.

Alternately a source of greater than atmospheric pressure could be used and applied to force the heated moldable sheet 34 down into the cavity to conform to its cavity surface with passages 22 providing means for the escape of air from the cavity.

On completion of the forming step the portion of the sheet 34 drawn down into the cavity becomes an image forming surface 36 with a flat outwardly extending rim portion 38 in contact with shoulder 24. Shoulder 24, rim wall 26, and the overhang portion of restrictor sheet 28 cause the sheet to deform to form a first sidewall portion 40 defining an inwardly facing peripheral groove. Contiguous thereto is a second sidewall portion defining an outwardly facing peripheral groove 42 caused by the restrictive aperture 30. As will be more clearly understood upon a reference to succeeding figures, the plastic sheet 34 also deforms in the vicinity of notch 32 to create an escapement notch 44 in groove 42.

The next step in button fabrication is to remove the scrap plastic sheet from the formed button shell. In FIG. 3, this step is shown accomplished by means of a circular rotating knife 46 shown in simplified form. Knife 46 has an edge driven by a rotating central shaft to cut sheet 34 and thereby define a button display shell 48 by severing the sheet from the molded portion at a point represented by the dotted line circle in the figures.

The removal of the unmolded portion of plastic sheet 34 leaves one or more button outer shells 48 captivated in consumable restrictor sheet 28. These button outer shells may then be fitted with pin fasteners as illustrated in FIGS. 4, 5 and 6. Insertion of a pin fastener may be accomplished either with or without the finished outer shell mounted on the restrictor sheet.

FIG. 4 is a perspective view illustrating one procedure for pin insertion in a button which has been removed from the restrictor sheet. In the figure, a pin fastener generally designated 50 appears above an inverted outer shell 48. Fastener 50 includes a diametrical fastening shank 52 with a piercing tip at one end thereof and an arcuate mounting portion 54 connected to shank 52. Arcuate mounting portion 54 is preferably substantially circular in shape, and the pin fastener may be formed of a single length of resilient wire sharpened to a point at one end thereof to provide for piercing of fabric. As indicated by the dotted line position of portion 54 appearing in FIG. 4, assembly of resilient fastener 50 and shell 48 is readily performed by deforming mounting portion 54 to clear second sidewall portion 42 and inserting portion 54 into the inwardly facing peripheral groove defined by first sidewall portion 40. Upon release, arcuate mounting portion 54 springs back to engage sidewall portion 40 and is captivated in the groove defined thereby. The result is a complete button assembly in which the fastener not only is retained within the fastener groove, but also provides added rigidity and structural strength to its associated outer shell.

FIGS. 5 and 6 aid in complete description of the objects and advantages of the present inventive fabrication procedure employing a consumable restrictor sheet. Once unmolded plastic material has been removed from the molded outer shells, either by a cutting tool as shown in FIG. 3, a hot steel rule die or other suitable means, and fasteners have been inserted, consumable restrictor sheet 28 may function as a point-of-sale display card for retail sale of a number of buttons. For this purpose, restrictor sheet 28 may be preprinted with suitable advertising or button identifying indicia which promote sale of the displayed buttons. In addition to performing this function, the consumable restrictor sheet presents other significant fabrication advantages. Because the restrictor sheet is replaced for each cycle of vacuum mold operation, residual heat absorbed by it is removed from the mold and the effective mold cycle time may be reduced. Also because restrictor sheet apertures are relatively easy to alter, the flexibility of the apparatus for changing the outer configuration of the molded part, adding glue to fix the shells to the sheet and other desirable alternatives are available at substantially lower cost.

FIG. 6 is a cross-sectional view of a portion of the multi-button display of FIG. 5 taken to illustrate the finished button construction on the restrictor sheet. The view also illustrates that, unlike typical badge type buttons using a pin somewhat similar to that shown in FIGS. 4, 6 and 7, buttons fabricated according to certain preferred embodiments of the present invention provide for a safety position of fastening shank 52 within the fastener mounting groove of the button.

To provide this safety position, the outer shell 48 may be fabricated with the small escapement notch previously referred to. As clearly appears in the cross-sectional view of FIG. 2, the escapement notch is a brief discontinuity in sidewall portion 42 providing the fastener shank with access to the inwardly facing fastener groove. Fastener 50 is fabricated so that shank 52 is slightly longer than the inside diameter of the continuous portion of sidewall 42, but slightly less than the inside diameter of sidewall 40. With such a construction, and as particularly shown in FIG. 7, pin fastener 50 may be slidably mounted in and rotated in assembled relation with outer shell 48 until the point end of shank 52 is aligned with escapement notch 44. The shank may then be depressed into the notch and rotated so that the fastener point is captivated within the fastener mounting groove. Relative rotation of the fastener and outer shell is represented in FIG. 7 by the solid and dotted line representations of shank 2. Of course, it will be apparent that this procedure is applicable both to placing the pins in a safety position while they are on display on their restrictor sheet and during times when they are fastened to an outer garment of a wearer. For button removal, the procedure is reversed. The outer shell of the button is grasped and rotated with respect to the fastener until the pin end of shank 52 reaches escapement notch 44 and allowed to release.

The remaining figures illustrate a unique alternate form of safety fastener element for use with a button outer shell of the type fabricated using the consumable restrictor sheet fabrication process and particularly suited to the process since, in certain embodiments, the button shell and fastener may be fabricated by the process merely by the addition of a relatively uncomplicated procedural step.

In FIG. 8, an inverted button outer shell is shown in perspective with an elongated resilient cross member fastener 60 positioned above it. Cross member fastener 60 may be fabricated of any sufficiently resilient material, but it is particularly advantageous to produce it from a portion of unused plastic sheet 34 after the molding step is completed. The particular cross member fastener shown has a pair of opposite outwardly convex arcuate edges 64 at opposite ends thereof and is cut so that its maximum length between edges 64 is somewhat greater than the diameter of the inwardly facing groove defined by sidewall portion 40 of shell 48. Cross member fastener 60 also has a pair of arcuate concave longitudinal edges 65, preferably having substantially the same radius of curvature as the periphery of shell 48 in embodiments in which fastener 60 is fabricated from a portion of sheet 34.

In use, as shown particularly in the sectional views of FIGS. 9 and 10, outer shell 48 is placed in a desired position on the outer surface of a layer of garment fabric 66. Fastener 60 is placed on the inner side of fabric 66, with its convex edges 64 wedging a small portion of fabric 66 deeply into the inwardly facing fastener groove. As shown in FIG. 9, cross member fastener 60 will initially assume an outwardly bowed position because its length is greater than the groove diameter.

The fastening procedure is completed by forcing resilient cross member fastener 60 through an over-center action to an inwardly bowed position illustrated in FIG. 10. This step is accomplished by light manual pressure on the central portion of fastener 60. When fastener 60 snaps over to the inwardly bowed position shown in FIG. 10, further clamping and pressure of the fabric between rim portion 38 and the surfaces of fastener 60 occurs.

Removal of the button is also a simple procedure. Cross member fastener 60 may be removed by grasping it centrally along its length and pulling gently outward. THis will cause the cross member to snap through center and flex so that it may be removed from the fastener groove. Alternately, on durable fabrics where stretching of the fabric is not a problem, the fabric on both sides of the fastener may be pulled along the fastener axis. This will cause the fastener to snap outward and the button outer shell to deform to release the fastener from its inwardly facing groove.

FIG. 11 illustrates another advantage of the consumable restrictor sheet applicable particularly to buttons with fastener elements of the type shown in FIGS. 8, 9 and 10. While in the case of buttons constructed as shown in FIGS. 5 and 6, removal from the restrictor sheet is easily facilitated by grasping the outer shell and slightly deforming the shell to provide clearance for button removal, it may be desirable to provide the button of FIG. 8 in a one piece configuration which makes such removal impossible. As shown particularly in FIG. 11, a pair of button outer shells 48 are positioned on a restrictor sheet subsequent to the step of removal of unwanted plastic material. However, instead of merely cutting about the periphery of shells 48, the cutting step defines a cross member fastener 60 removably secured to lower shell 48 by means of a perforated cut 67 and three complete cuts defining the remainder of the cross member edges. This leaves a one piece fastener-outer shell assembly which may be easily manually separated by the wearer. However, if the assembly is to be distributed as one piece, the restrictor sheet must somehow be removed from the assembly without severing perforated cut 67. Since the restrictor sheet is consumable, one way of achieving separation is to utilize a perforated or tear away restrictor sheet with perforated cuts therein to facilitate separation. In the process of destruction of the restrictor sheet (represented by the detached dotted line segment 68) the fastener-outer shell assemblies are released.

While a glance at FIG. 11 reveals the material economies realized by using a cross member fastener with arcuately concave longitudinal edges, and such a shape also aids in holding the fastener during insertion and removal, it is not essential to the fastener function that the member be so shaped. FIG. 12 illustrates an acceptable alternative form of cross member fastener 70 in which one longitudinal edge is arcuate while the opposite edge is straight. Also appearing in the figure for the purpose of comparison is the preferred shape fastener 60. It should also be understood that although in certain embodiments the cross member fastener is constructed of the same material as the outer shell, the present invention is not limited to such construction.

FIG. 13 is a simplified representation of one procedure for fabrication of a fastener-button shell assembly of the type previously referred to. In FIG. 13, a steel rule die generally designated 72 comprises a plurality of circular steel members with pairs of arcuate segment members joining them. The members are set in a base 74, and each circular member has a plurality of discontinuities defining a nicked edge 76 along a portion thereof between an adjacent pair of arcuate segment members. In practice, the die is heated to a temperature which will readily sever the plastic sheet material and placed in brief contact therewith. The contact results in circular cuts defining the edges of the button outer shells, with the nicked edge cuts creating a perforated cut attachment to a cross member fastener. Thus a simple one step operation trims the button shell and creates a detachable fastener.

From this description, it is apparent that there has been provided, in accordance with the invention, an inventive button producing procedure and buttons produced thereby, which fully satisfy the aims and advantages previously mentioned. While the invention has been described in conjunctin with specific embodiments thereof, many alternatives, modifications and variations will be apparent to those of skill in the art in light of this description. Accordingly, it is intended to embrace all such alternatives, modifications and variations as fall within the spirit and scope of the appended claims.

What is claimed is:

1. A button for ornamental or expressive purposes and suitable for fastening to an unbroken fabric surface, comprising:
   (a) an outer shell having a front wall with an image forming surface thereon and a generally transversely extending sidewall portion defining an inwardly facing peripheral groove, one side of said groove being spaced from said front wall, said groove having a diameter defined by a distance across said shell at the bottom of said inwardly facing groove;
   (b) an elongated resilient removable inner cross member having a longitudinal dimension greater than said diameter and opposed contact edges shaped to substantially conform to said groove;
   (c) said cross member being connected to opposing sides of said shell with said contact edges engaging the surface of said groove, whereby said cross member may initially assume an outwardly bowed position when a layer of fabric is placed between said cross member and said shell, and be forced to an inwardly bowed fastening position through an over-center action.

2. The structure of claim 1 wherein said shell and cross member are constructed of like material, the material being a plastic sheet having a thickness in the range of 0.010 to 0.040 inches.

3. The structure of claim 1 wherein said inwardly facing groove is annular in shape and said contact edges are arcuate segments of substantially the same radius of curvature as said groove surface.

4. The structure of claim 2 wherein said cross member has a pair of arcuate inwardly concave longitudinal edges, said outer shell sidewall portion is substantially circular in form, and said longitudinal edges and sidewall portion have substantially the same radius of curvature.

* * * * *